(12) United States Patent
Thompson

(10) Patent No.: US 11,169,255 B2
(45) Date of Patent: Nov. 9, 2021

(54) PROCESSING A SIGNAL REPRESENTATIVE OF AT LEAST ONE PHYSICAL PROPERTY OF A PHYSICAL SYSTEM

(71) Applicant: TRW Limited, Solihull (GB)

(72) Inventor: Martin John Thompson, Solihull (GB)

(73) Assignee: TRW Limited, Solihull (GB)

( * ) Notice: Subject to any disclaimer, the term of this patent is extended or adjusted under 35 U.S.C. 154(b) by 439 days.

(21) Appl. No.: 15/834,150

(22) Filed: Dec. 7, 2017

(65) Prior Publication Data
US 2018/0164426 A1 Jun. 14, 2018

(30) Foreign Application Priority Data
Dec. 8, 2016 (GB) .................................... 1620912

(51) Int. Cl.
*G01S 13/88* (2006.01)
*G01L 17/00* (2006.01)
(Continued)

(52) U.S. Cl.
CPC .......... *G01S 13/88* (2013.01); *B60C 23/0437* (2013.01); *B60C 23/0444* (2013.01);
(Continued)

(58) Field of Classification Search
CPC ... G01S 13/88; G01S 7/35; G01L 9/00; G01L 17/00; B60C 23/0437; B60C 23/0444
See application file for complete search history.

(56) References Cited

U.S. PATENT DOCUMENTS 4,112,496 A 9/1978 Stevens
6,385,511 B1 5/2002 Fondeur et al.
(Continued)

FOREIGN PATENT DOCUMENTS

CA 2135215 A1 5/1996
CA 2304083 A1 10/2000
(Continued)

OTHER PUBLICATIONS

Wenzel et al.. "Hybrid Genetic Algorithms / Extended Kalman Filter Approach for Vehicle State and Parameter Estimation," Control 2004, University of Bath, UK, Sep. 2004, pp. 1-5 (Year: 2004).*
(Continued)

*Primary Examiner* — John E Breene
*Assistant Examiner* — Liam R Casey
(74) *Attorney, Agent, or Firm* — MacMillan, Sobanski & Todd, LLC

(57) ABSTRACT

A method of processing a signal representative of at least one physical property of a physical system comprising generating a set of predicted signals, the set of predicted signals comprising at least one member, each member representing a physical state of the physical system, generating a predicted waveform or the signal for each member dependent upon the physical state, and comparing each predicted waveform with the signal to determine the accuracy with which the physical state represented by the member for which the predicted signal was generated matches an actual physical state of the physical system. In an example embodiment, the physical system is a tyre and the state includes the air pressure within the tyre.

18 Claims, 1 Drawing Sheet

(51) Int. Cl.
*G01L 9/00* (2006.01)
*G01S 7/35* (2006.01)
*B60C 23/04* (2006.01)
*G01V 3/12* (2006.01)

(52) U.S. Cl.
CPC ............... *G01L 9/00* (2013.01); *G01L 17/00* (2013.01); *G01V 3/12* (2013.01); *G01S 7/35* (2013.01)

(56) References Cited

U.S. PATENT DOCUMENTS

| | | | |
|---|---|---|---|
| 6,802,213 B1* | 10/2004 | Agrotis | B60C 23/061 73/146 |
| 7,924,147 B2* | 4/2011 | Mathias | B60C 23/0416 340/442 |
| 7,924,197 B1* | 4/2011 | Liu | H03M 1/002 341/136 |
| 8,872,693 B1 | 10/2014 | Malas et al. | |
| 2003/0071723 A1* | 4/2003 | Tang | B60C 23/0416 340/445 |
| 2004/0111038 A1 | 6/2004 | Salla et al. | |
| 2005/0025898 A1* | 2/2005 | Bengtsson | C23C 4/134 427/446 |
| 2005/0093688 A1* | 5/2005 | Sinnett | B60C 23/0433 340/447 |
| 2006/0137788 A1* | 6/2006 | Myatt | B60C 9/2006 152/152.1 |
| 2007/0279188 A1* | 12/2007 | Thiesen | B60C 23/0408 340/10.1 |
| 2009/0167503 A1* | 7/2009 | Cook | H04Q 9/00 340/10.41 |
| 2010/0034054 A1 | 2/2010 | Wayland et al. | |
| 2010/0207613 A1* | 8/2010 | Erickson | G01D 5/2013 324/207.25 |
| 2011/0163905 A1 | 7/2011 | Denis et al. | |
| 2012/0040602 A1* | 2/2012 | Charland | F41H 13/0075 455/1 |
| 2015/0161567 A1* | 6/2015 | Mondal | G06Q 10/1053 705/321 |
| 2015/0203109 A1* | 7/2015 | McClain | B62D 15/025 701/41 |
| 2016/0308110 A1* | 10/2016 | Tanaka | H01L 39/20 |
| 2017/0004400 A1* | 1/2017 | Frericks | G06N 3/126 |

FOREIGN PATENT DOCUMENTS

| | | |
|---|---|---|
| DE | 19541459 A1 | 5/1997 |
| DE | 19845116 C1 | 12/1999 |
| DE | 102004020426 A1 | 11/2005 |
| EP | 1043603 A1 | 10/2000 |
| GB | 2325304 A | 11/1998 |
| JP | 6252478 A | 3/1987 |
| JP | 2007327935 A | 12/2007 |
| JP | 2010032319 A | 2/2010 |
| WO | 2004053521 A1 | 6/2004 |
| WO | 2017025754 A1 | 2/2017 |

OTHER PUBLICATIONS

UK Search Report, Application No. GB1514249.0 dated Jan. 12, 2016.

UK Search Report, Application No. GB1620912.4 dated May 19, 2017.

* cited by examiner

PROCESSING A SIGNAL REPRESENTATIVE OF AT LEAST ONE PHYSICAL PROPERTY OF A PHYSICAL SYSTEM

CROSS-REFERENCE TO RELATED APPLICATIONS

This application claims priority to Britain Patent Application No. 1620912.4, filed 8 Dec. 2016, the disclosures of which are incorporated herein by reference in entirety.

BACKGROUND OF THE INVENTION

This invention relates to a method of processing a signal representative of at least one physical property of a physical system and associated apparatus.

Techniques using the collection of radiation reflected off a target are well known; examples of such techniques include RADAR (using radio waves), LIDAR (using light waves) and SONAR (using sound waves). Generally, some automatic processing of the received radiation is carried out so as to estimate data relating to the position of the target—for example range and/or bearing.

Taking the example of vehicular RADAR systems, which can be used for example to detect other vehicles around a host vehicle as described in the PCT patent application published as WO2004/053521, typically a frequency modulated continuous wave (FMCW) radar is used, which transmits a frequency modulated signal. In the example where the modulation is a simple sawtooth ramp, then the distance of an object can be estimated using the frequency difference between the transmitted output and reflected signals at the time of reception of the reflected signals. Typically, this would be done by mixing the output and input signals and detecting a beat signal. The speed of the object can be estimated using a further frequency component—a Doppler component—in the mixed signal.

To date, the analysis of such signals, an in particular in FMCW radar systems, have involved spectral analysis of the reflected signals. This means that the received reflected radiation (after typically having been mixed with the output signal) is converted into the frequency domain before further analysis takes place. The position and speed of targets can then be determined by looking for peaks in the determined frequency spectra. The typical mathematical method for calculating these spectra is the fast Fourier transformation (FFT). FFTs are processor-intensive to carry out, and use much memory bandwidth, as the algorithms used needs access to a wide area of memory in a non-sequential manner.

Furthermore, the data that can be returned from such spectral analysis is in effect limited to position and speed, acceleration and jerk (rate of change of acceleration) causing "smearing" of the signal between frequency bins. In order to perform the FFT algorithm, data needs to be batched into lengthy sequential chunks. This also means that an FFT will provide a time-averaged measure of the frequency spectrum over the period of the chunk.

Techniques concerning the measurement of physical states of systems based on resonances are known, but generally depend on the waveform being measured being static. As such, they are not very useful with dynamic systems.

BRIEF SUMMARY OF THE INVENTION

According to a first aspect of the invention, there is provided a method of processing a signal representative of at least one physical property of a physical system, the method comprising generating a set of predicted signals, the set of predicted signals comprising at least one member, each member representing a physical state of the physical system, generating a predicted waveform for the signal for each member dependent upon the physical state, and comparing each predicted waveform with the signal to determine the accuracy with which the physical state represented by the member for which the predicted signal was generated matches an actual physical state of the physical system.

As such, it will be appreciated that it is possible to model the physical state of a system using received signals, and that the system can be characterised in the time domain without the need to carry out spectral analysis (e.g. Fast Fourier Transforms (FFTs) and so on). The model can be very flexible about the parameters modelled.

Typically, the physical system will be such that the signal does not represent received radiation reflected from a target, or where the signal does represent received radiation reflected from a target, the physical state does not represent the state of the target. Typically, the physical state does not comprise the position, speed, acceleration and/or jerk of the target.

The signal may comprise a periodic component, although a spectrum of the signal may vary.

The method may comprise driving the physical system with a drive signal. Typically, the drive signal will comprise a periodic component having a peak power close to a resonant frequency of the physical system; close may be within 10%, 5%, 2% or 1% of the resonant frequency. The signal may comprise the physical system's response to the drive signal. Rather than simply taking a frequency spectrum of the response of the physical system to the stimulus, the present method provides a more flexible system of analysis of the signal. Furthermore, resolution is only limited by the available observation time, rather than the number of frequency bins that would be required in a spectral analysis approach, an increasing number of bins requiring an increasing amount of computing power and storage to calculate.

The step of generating a predicted waveform may comprise estimating the waveform of the drive signal and applying at least one transform to the waveform of the drive signal in order to arrive at the predicted waveform. At least one transform may depend on each of the physical state of the system. By starting with the drive signal, allowance can be made for the operation of the transmitter transmitting the transmitted radiation; such a system is tolerant to inaccurate or non-linear modulation, whereas prior art spectrally analysed frequency modulated continuous wave (FMCW) radar is sensitive to the modulation used. Indeed, any convenient modulation scheme could be used, such as frequency modulated continuous wave (FMCW).

Where the physical state comprises the position of a target from which radiation is reflected, at least one transform may comprise modifying the frequency and phase of the waveform dependent upon a range of the target from the receiver. Where multiple receivers are used, this may lead to the correct position of the target being quickly apparent, as position will be given by the point where the ranges with high correlation overlap.

Where the physical state comprises the position of a target from which radiation is reflected, at least one transform may comprise transforming the amplitude of the waveform dependent upon on the position of the target. This can lead to more accurate estimation of the parameters, because generally methods employing spectral analysis only use amplitude to determine the strength of the return (and so the confidence that such systems have in a putative target). The amplitude may be transformed dependent on the position so as to account for not only the size and/or position of a target (in particular, taking into account the decreasing signal amplitude with range of the target) but also differential transmitter and receiver behaviour with both range and/or bearing. Notably, many radar and other such system antennas have significant changes in gain based upon angular position (e.g. side lobes); this method can make use of that in estimating the parameters.

The method may comprise receiving the signal, potentially at one or more receivers, which may comprise the drive signal as passed through the physical system; passing through the physical system may comprise at least one of being transmitted and reflected through the physical system.

In one embodiment, the physical system is an enclosure defining a void having an internal fluid, typically pressure, such as a vehicle tyre or a pipe, tube or artery. The physical state may therefore comprise the internal fluid pressure. There may be a resonant chamber, typically formed as a capsule, within the void. The chamber may have a characteristic dimension, such as a length or breadth, which defines the resonant frequency. Typically, the chamber will be within the void but sealed relative thereto, such that changing fluid pressure within the void may cause the size of the chamber to vary and consequently the resonant frequency. Introducing the drive signal, which may comprise radio frequency signal at close to the resonant frequency, may cause some resonance in the chamber. The method may comprise measuring the response of the system to the drive signal, and as such the method may comprise receiving a radio frequency signal as the signal. The signal in this case may comprise decaying resonance within the chamber.

If the enclosure is subject to outside physical inputs, the physical state may comprise a representation of the physical inputs. In the example of a vehicle tyre, the physical state could comprise the rotational speed of the vehicle tyre, and optionally also characteristics of the surface over which the vehicle tyre is being driven, such as its vertical profile.

The step of comparing the predicted waveform with the waveform of the signal may comprise determining the correlation between the predicted signal and the waveform of the signal. The method may comprise determining a degree of fit of each predicted signal with the waveform of the signal by determining the degree of correlation of the predicted signal and the waveform of the signal.

Typically, the physical state of the physical system can include a parameter set comprising at least one parameter of the physical state of the physical system. The step of generating the set of predicted signals may comprise generating a set of members scattered through a parameter space defined by the parameter set. The members may be randomly, or pseudo-randomly, scattered throughout the parameter space. However, the scattering may be weighted to areas where it is more likely to find closely-matching signals.

After the comparison between predicted and received waveforms, the method may comprise repopulating the set of predicted signals with members in the parameter space so that the members are scattered around the members of the set before repopulating preferentially with increasing degree of correlation. Fewer, or no members, may be scattered around members with a lower degree of correlation; indeed, members having a degree of correlation less than a threshold or those having the lowest degree of correlation may be removed from the set of predicted signals.

After repopulating the set of predicted signals, the method may repeat the step of comparing each predicted signal, typically to a waveform of received radiation received subsequently to that used for the previous step of comparing. The steps of repopulating and comparing may repeat indefinitely; as such, this method may define a particle filter, using Monte Carlo methods to predict and match signals corresponding to the physical state in the received radiation. Such methods are more conveniently programmed than, for example, the FFT calculations previously used in methods employing spectral analysis. In particular, the methods described above may more conveniently be implemented in parallel processing systems (as it is easier to define a set of tasks for each processor to carry out), and memory access is more predictable, whereas FFTs generally require extremely non-sequential access to a large area of memory.

The step of repopulating the set of predicted signals may comprise updating the parameters of each predicted signal based on an elapsed time between the reception of the original signal and the reception of the subsequently received reflected radiation.

Typically, at least some of the members and also their associated degree of correlation will be output by the method as potential physical states of the system. In one embodiment, only those members whose degree of correlation meets at least one criterion may be output; a criterion may be that the correlation exceeds a threshold.

A further advantage is that a comparison can be made immediately that radiation is received, with no necessary need to wait for a temporal block of data.

According to a second aspect of the invention, there is provided a signal processing apparatus, comprising an input for a signal, a processor arranged to process the signal and memory containing program instructions, the program instructions when executed on the processor causing the apparatus to carry out the method of the first aspect of the invention.

As such, the apparatus may further comprise a receiver at the input arranged to receive the signal. It may also comprise a transmitter circuit having at least one output for a drive signal.

The apparatus may be provided with an output, at which members and typically their associated degrees of correlation are output in use.

Other advantages of this invention will become apparent to those skilled in the art from the following detailed description of the preferred embodiments, when read in light of the accompanying drawings.

DETAILED DESCRIPTION OF THE INVENTION

Figure 1:
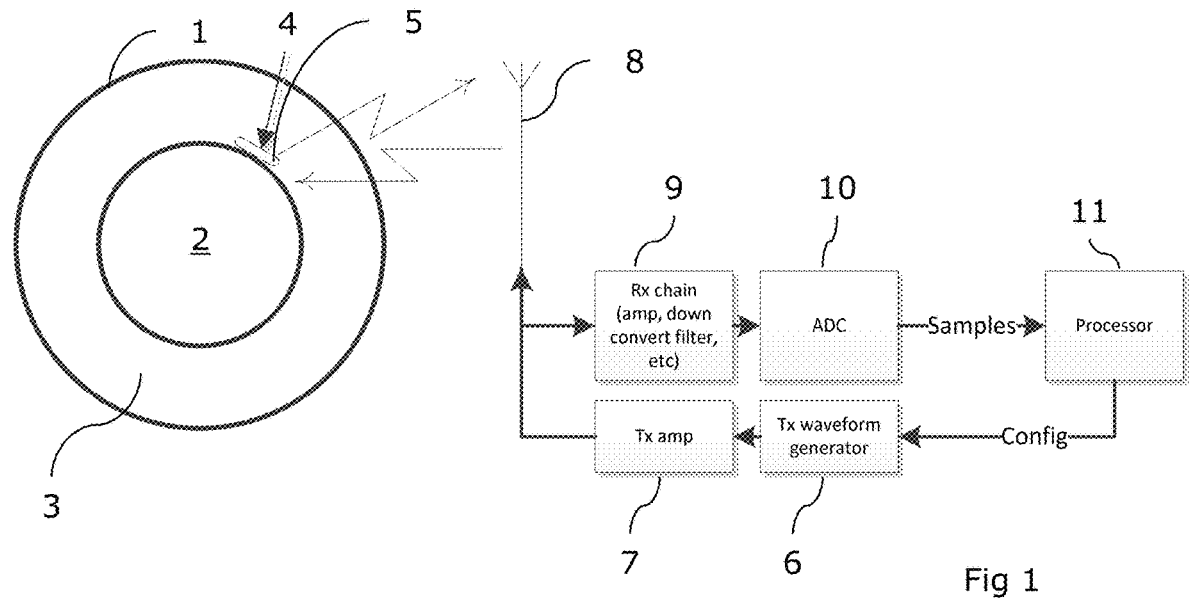
FIG. 1 shows a tyre pressure monitoring system in accordance with an embodiment of the invention.

FIG. 1 of the accompanying drawings shows a tyre pressure monitoring system which functions as a signal processing apparatus in accordance with a first embodiment of the invention.

In this embodiment, a tyre 1 is fitted on a wheel 2. Thus, the tyre defines a void 3 therewithin that is filled with pressurised air. It is desirable to know the air pressure within the void 3 to ensure that the tyre is correctly inflated.

One way of monitoring the tyre pressure is to place a transducer within the void 3 which measures the pressure and then transmits that outside of the tyre 1. However, this requires an active transducer to be placed in the tyre, which will require regular servicing (e.g. battery replacement) and involves sensitive circuitry being placed within a physically harsh environment.

In this embodiment, however, there is instead a simple resonant chamber 4. The chamber is formed as a sealed capsule, so as to define its own void 5 therewith. It is formed of slightly compliant material, so that as the pressure in the tyre void 3 varies, the fixed amount of gas within the chamber void 5 will lead to the volume and so linear dimensions of the chamber 3 changing.

Given that the dimensions—particularly the length—of the chamber 5 will give the chamber 4 a characteristic resonant frequency for a given form of radiation (typically corresponding to the chamber length being a half-wavelength), this resonant frequency will change as the length of the chamber 4 changes. Thus, there will be a relationship between the tyre pressure and the resonant frequency. The chamber will re-radiate radiation impinging on it close to its resonant frequency in a frequency-dependent manner (typically, re-radiating at or close to its resonant frequency); conversely, if radiation close to a nominal resonant frequency is applied to the chamber, as the chamber changes size, the radiation re-radiated by it will change in a predictable manner.

This can be exploited by generating a drive signal close to an expected resonant frequency—typically of the form of microwave electromagnetic radiation—using a waveform generator 6. This is amplified by amplifier 7 and transmitted from antenna 8. A reflected signal is received by antenna 8, amplified and down-mixed using reception circuitry 9 and converted to a digital signal in analogue to digital converter (ADC) 10. The samples thus measured are passed to processor 11.

Figure 2:
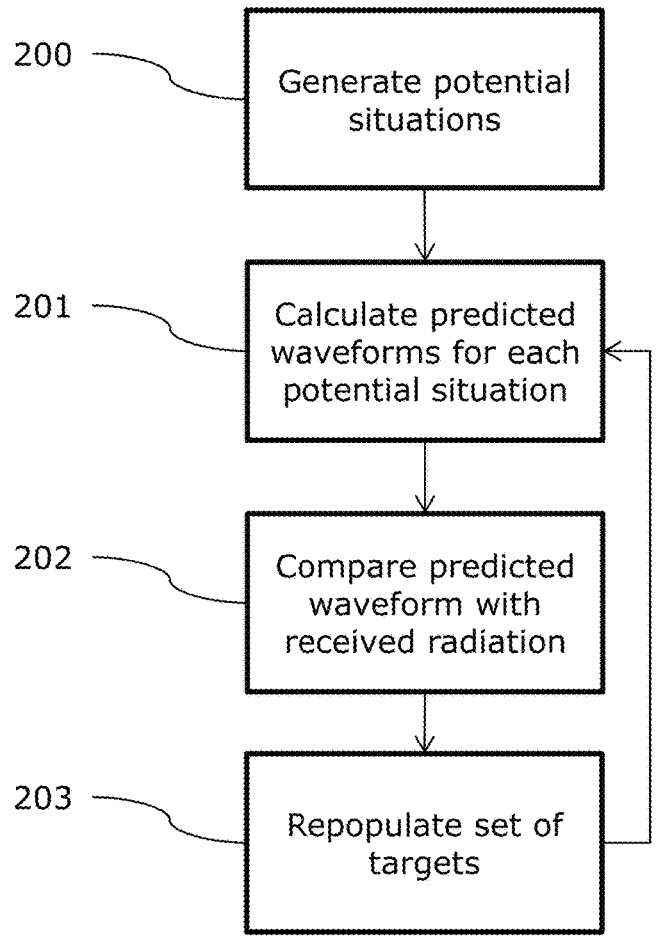
FIG. 2 shows a flow chart showing the operation of the processor of the apparatus of FIG. 1.

The processor carries out the steps shown in FIG. 2 of the accompanying drawings. In step 200, a set of potential physical states is generated. In the order of a thousand to ten thousand candidates can be generated. Each candidate will have a position in a parameter space. The parameter space can have as many dimensions as desired. Typically, the dimensions will include the pressure within the tyre void 3, and potentially will also include the dimensions of the chamber 4, the angular position and speed of the wheel 2 as it rotates, and potentially also bumps in the road over which the tyre 1 is being driven.

At step 201, for each potential state, a predicted waveform for the radiation as received at each antenna 8, and received, processed and digitised is generated using processor 11. The predicted waveform can also be modified to correct for the performance of the antenna 8 receiver circuits 9, transmission circuitry 6, 7 and ADC 10. For example, if the antenna 8 has directional gain, then the amplitude of the predicted waveform will depend upon the angular position of the wheel 2.

Each of the parameters will have an effect on the predicted waveform. The most important component for this embodiment is that relating to the re-radiation of the close-to-resonant drive signal from the chamber 4. It may also be possible to detect the Doppler shift in frequency as the wheel 2 rotates the chamber 4 relative to the antenna 8, with the angular position and speed of the wheel 2 being part of the physical state modelled.

Once each predicted waveform has been generated, at step 202, a comparison is made between each predicted waveform and the output of the ADC. The correlation between each predicted waveform and the output of the ADC is calculated. This indicates how accurately the potential state reflects the actual state, and in particular how accurately the potential state models the pressure in the tyre void 3.

At step 203, the set of target candidates is repopulated. Typically, those target candidates with a low correlation will be removed. Those with a high correlation will have their parameters updated based upon the time elapsed since the last signal (because, due to the rotation of the wheel 2, the chamber 4 will have moved). Further new target candidates will be added, concentrated around the successful candidates.

The method then repeats from step 201, with new predicted waveforms being generated and a comparison made to those predicted waveforms with newly-received radiation. Thus, each section of received radiation can be analysed as it is received; typically, prior art spectral analysis methods required $2^n$ samples, where n was between 10 and 14, whereas the current method can process received data down to individual samples.

As such, this method can have the following potential advantages over the prior art spectral analysis methods:

No reliance on frequency domain processing so easier to understand based on simple time-series principles.

Can process each return sample as it is captured. No need to capture blocks of data before processing. Reduces latency.

Easier treatment of arbitrary waveform modulation.

Ability to include higher order target motion models (that directly measure acceleration, jerk, higher order derivatives)

Ability to include other target parameters (e.g. width).

Ability to use information about antenna characteristics (e.g. sidelobes with differential gain) directly.

Easy extension to multiple transmit and receive antennas (including arbitrary array patterns).

Easy extension to 3-Dimensional target detection/tracking.

Processing technique is very highly parallelisable.

Easier to embed in low-cost hardware (e.g. FPGA)

Scales easily for more complex systems.

Ability to handle weak target returns due to removal of thresholding (where in spectral systems, the signal would be lost in noise; typically any frequency domain signal that is less strong than a threshold is discarded as noise).

No need to change batteries within the tyre—the chamber 4 can be entirely passive.

Can model dynamic changes in tyre pressure as vehicle passes over bumps etc.

Modelling the angular position and speed of the wheel can result in useful measurements of these quantities being provided.

Whilst this embodiment has been described with reference to microwave radiation, it is equally applicable to other electromagnetic waves, such as radio waves or visible light, or sound waves or other such systems.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of monitoring an internal fluid pressure of a vehicle tyre, the vehicle tyre having at least one physical property including the internal fluid pressure, the method comprising:
driving the vehicle tyre with a drive signal so as to generate a response signal in response to the drive signal, wherein the response signal varies according to the internal fluid pressure;
generating a set of predicted signals, the set of predicted signals comprising at least one member, each member representing a physical state of the vehicle tyre;
comparing each predicted signal with the response signal to determine the accuracy with which the physical state represented by the member for which the predicted signal was generated matches an actual physical state of the vehicle tyre;
in which the physical state of the vehicle tyre includes a parameter set comprising at least one parameter of the physical state of the vehicle tyre including the internal fluid pressure and in which the step of generating the set of predicted signals comprises generating a set of members scattered through a parameter space defined by the parameter set; and
the method further comprising, after the comparison between predicted and response signals, repopulating the set of predicted signals with selected members in the parameter space so that the selected members are scattered such that the repopulated set of predicted signals provide a higher degree of correlation to the response signal than the members of the set before repopulating, and
in which at least some of the members and their associated degree of correlation are output by the method as potential physical states of the vehicle tyre including the internal fluid pressure.

2. The method of claim 1, in which members having a low degree of correlation are removed from the set of predicted signals.

3. The method of claim 1, comprising, after repopulating the set of predicted signals, repeating the step of comparing each predicted signal to a waveform of a signal received subsequently to that used for the previous step of comparing.

4. The method of claim 3, in which the steps of repopulating and comparing repeat indefinitely.

5. The method of claim 1, in which the step of repopulating the set of predicted signals comprises updating the parameters of each repopulated predicted signal based on an elapsed time between reception of an original received waveform and reception of a subsequently received waveform.

6. A signal processing apparatus, comprising an input for a signal, a processor arranged to process the signal and memory containing program instructions, the program instructions when executed on the processor causing the apparatus to carry out the method of claim 1.

7. The apparatus of claim 6, comprising one or more receivers at the input arranged to receive the signal.

8. The apparatus of claim 6, comprising a transmitter circuit having at least one output for a drive signal.

9. The apparatus of claim 6, provided with an output, at which members and their associated degrees of correlation are output in use.

10. A method of monitoring an internal fluid pressure of a vehicle tyre, the vehicle tyre having at least one physical property including the internal fluid pressure, the method comprising:
generating a set of predicted signals, the set of predicted signals comprising at least one member, each member representing a physical state of the vehicle tyre, the physical state including the internal fluid pressure,
driving the vehicle tyre with a drive signal, so as to generate a response signal in response to the drive signal, wherein the response signal varies according to the internal fluid pressure;
comparing each predicted signal with response signal to determine the accuracy with which the physical state represented by the member for which the predicted signal was generated matches an actual physical state of the vehicle tyre;
wherein the drive signal comprises a periodic radiation component having a peak power close to a resonant frequency of the vehicle tyre, wherein the response includes a varied reflection of the radiation component according to the physical property, and
in which at least some of the members are output by the method as potential physical states of the vehicle tyre including the internal fluid pressure.

11. The method of claim 10, in which the drive signal comprises a periodic component in which a spectrum of the drive signal varies.

12. The method of claim 10, in which the vehicle tyre is subject to outside physical inputs, the predicted signals including a representation of the physical inputs.

13. The method of claim 12, in which the at least one physical property includes the rotational speed of the vehicle tyre.

14. The method of claim 12, in which the at least one physical property includes characteristics of the surface over which the vehicle tyre is being driven.

15. The method of claim 10, in which the step of comparing the predicted signal with the received waveform comprises determining a degree of correlation between the predicted signal and the received waveform.

16. The method of claim 10, in which the physical state of the vehicle tyre includes a parameter set comprising at least one parameter of the physical state of the vehicle tyre and in which the step of generating the set of predicted signals comprises generating a set of members scattered through a parameter space defined by the parameter set.

17. The method of claim 16 comprising, after the comparison between predicted signals and received waveforms, repopulating the set of predicted signals with selected members in the parameter space so that the selected members are scattered such that the repopulated set of predicted signals provide a higher degree of correlation to the received waveforms than the members of the set before repopulating.

18. A signal processing apparatus, comprising an input for a signal, a processor arranged to process the signal and memory containing program instructions, the program instructions when executed on the processor causing the apparatus to carry out the method of claim 10.

* * * * *